United States Patent
Lee et al.

(10) Patent No.: US 10,904,848 B2
(45) Date of Patent: Jan. 26, 2021

(54) SYNCHRONIZATION METHOD OF USER EQUIPMENT IN WIRELESS COMMUNICATION SYSTEM AND USER EQUIPMENT USING METHOD

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 284 days.

(21) Appl. No.: 15/742,876

(22) PCT Filed: Jul. 8, 2016

(86) PCT No.: PCT/KR2016/007439
§ 371 (c)(1),
(2) Date: Jan. 8, 2018

(87) PCT Pub. No.: WO2017/007280
PCT Pub. Date: Jan. 12, 2017

(65) Prior Publication Data
US 2018/0213499 A1    Jul. 26, 2018

Related U.S. Application Data

(60) Provisional application No. 62/190,720, filed on Jul. 9, 2015.

(51) Int. Cl.
*H04W 4/40* (2018.01)
*H04W 56/00* (2009.01)
*H04W 72/12* (2009.01)

(52) U.S. Cl.
CPC ........ *H04W 56/0015* (2013.01); *H04W 4/40* (2018.02); *H04W 56/002* (2013.01); *H04W 72/1289* (2013.01)

(58) Field of Classification Search
None
See application file for complete search history.

(56) References Cited

U.S. PATENT DOCUMENTS

2010/0103033 A1* 4/2010 Roh ................. G01S 19/40
                                            342/357.32
2016/0295624 A1* 10/2016 Novlan ............. H04W 72/04
(Continued)

FOREIGN PATENT DOCUMENTS

JP    2015126393    7/2015
KR    100516895     9/2005
(Continued)

OTHER PUBLICATIONS

PCT International Application No. PCT/KR2016/007439, International Search Report dated Oct. 13, 2016, 4 pages.
(Continued)

*Primary Examiner* — Jenkey Van
(74) *Attorney, Agent, or Firm* — Lee Hong Degerman Kang Waimey

(57) ABSTRACT

Provided are a synchronization method of first user equipment (P-UE) in a wireless communication system and user equipment using the method. The method involves receiving a V2X (vehicle-to-everything) message, sent by second user equipment (V-UE) via a second carrier, and performing synchronization on the basis of the V2X message. The first user equipment (P-UE) communicates with a base station via a first carrier, wherein the first carrier differs from the second carrier.

8 Claims, 13 Drawing Sheets

(56) References Cited

U.S. PATENT DOCUMENTS

| | | | |
|---|---|---|---|
| 2016/0330728 A1* | 11/2016 | Sorrentino | H04W 72/048 |
| 2016/0360524 A1* | 12/2016 | Blasco Serrano | H04W 76/14 |
| 2017/0006568 A1* | 1/2017 | Abedini | H04W 56/0015 |
| 2017/0034825 A1* | 2/2017 | Harada | H04W 72/0453 |
| 2018/0049104 A1* | 2/2018 | Van Phan | H04W 76/14 |
| 2018/0063825 A1* | 3/2018 | Van Phan | H04W 52/0219 |
| 2018/0132202 A1* | 5/2018 | Kalhan | H04W 8/005 |
| 2018/0139002 A1* | 5/2018 | Blasco Serrano | H04W 56/002 |
| 2018/0160382 A1* | 6/2018 | Hou | H04W 4/00 |
| 2018/0279242 A1* | 9/2018 | Kwak | H04W 24/08 |

FOREIGN PATENT DOCUMENTS

| | | |
|---|---|---|
| KR | 100686241 | 2/2007 |
| KR | 1020130029355 | 3/2013 |
| KR | 1020150062561 | 6/2015 |
| WO | 2016108680 | 7/2016 |

OTHER PUBLICATIONS

European Patent Office Application Serial No. 16821686.9, Search Report dated Jan. 31, 2019, 7 pages.

Japan Patent Office Application No. 2018-500602, Notice of Allowance dated Dec. 11, 2018, 3 pages.

LG Electronics, "Synchronization enhancements for UE-to-network relay operation", 3GPP TSG RAN WG1 Meeting #81, R1-152722, May 2015, 3 pages.

Qualcomm, "[Draft] LS on Type 1 discovery for partial and outside network coverage", 3GPP TSG RAN WG1 Meeting #81, R1-153556, May 2015, 2 pages.

NTT Docomo, "Type 1 discovery for partial and outside network coverage scenarios", 3GPP TSG RAN WG1 Meeting #80bis, R1-151963, Apr. 2015, 5 pages.

* cited by examiner

SYNCHRONIZATION METHOD OF USER EQUIPMENT IN WIRELESS COMMUNICATION SYSTEM AND USER EQUIPMENT USING METHOD

CROSS-REFERENCE TO RELATED APPLICATIONS

This application is the National Stage filing under 35 U.S.C. 371 of International Application No. PCT/KR2016/007439, filed on Jul. 8, 2016, which claims the benefit of U.S. Provisional Application No. 62/190,720, filed on Jul. 9, 2015, the contents of which are all hereby incorporated by reference herein in their entirety.

BACKGROUND OF THE INVENTION

Field of the Invention

The present invention relates to wireless communications, and more particularly, relates to a synchronization method performed by a user equipment in a wireless communication system and a user equipment using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, the D2D operation may also be applied to vehicle-to-everything (V2X). The V2X is a general name for the communication technique through a vehicle and all interfaces. The format of the V2X includes vehicle-to-vehicle (V2V), vehicle-to-infrastructure (V2I), vehicle-to-person (V2P), and the like.

In a V2X communication, in order to successfully transmit and receive a signal, time and/or frequency synchronization should be tuned between user equipments that join the V2X communication. When a user equipment should receive a signal according to a V2X communication on a different frequency, not a serving frequency, or a signal receiver is unable to receive a signal in two different frequencies simultaneously, it may be problematic how synchronization for the V2X communication is performed.

SUMMARY OF THE INVENTION

An object of the present invention is to provide a synchronization method performed by a user equipment in a wireless communication system and a user equipment using the method.

In one aspect, provided is a method for performing synchronization performed by a first user equipment (P-UE) in a wireless communication system. The method includes receiving a vehicle-to-everything (V2X) message transmitted by a second UE (V-UE) through a second carrier, and performing synchronization based on the V2X message. The first UE (P-UE) performs a communication with an eNB through a first carrier, and the second carrier is different carrier from the first carrier.

The first UE may perform a communication with the second UE (V-UE) after synchronization based on the V2X message.

The first UE (P-UE) may receive configuration information for receiving the V2X message from the eNB.

The configuration information may inform a period and a resource able to receive the V2X message to the first UE (P-UE).

The V2X message may include a Sidelink synchronization signal (SLSS).

The SLSS may be synchronized with GPS synchronization based on a global positioning system (GPS) signal, and transmitted by the second UE (V-UE).

When the second UE (V-UE) may be a UE that maintains the GPS synchronization with predefined reliability or more.

The first UE (P-UE) may receive gap configuration information from the eNB, and receive the V2X message from the second UE (V-UE) within a gap duration indicated by the gap configuration information.

The eNB may transmit only an essential signal to the first UE (P-UE) in the gap duration.

In another aspect, provided is a method for transmitting a signal performed by a second user equipment (V-UE) in a wireless communication system. The method includes transmitting a vehicle-to-everything (V2X) message through a second carrier, and transmitting a V2X message for a first UE (P-UE) through a first carrier only on a limited time. The V2X message for a first UE (P-UE) includes a Sidelink synchronization signal (SLSS), and the first carrier is different carrier from the second carrier.

The limited time may be configured by an eNB.

The limited time may be a time when a predetermined event is generated.

In still another aspect, provided is a user equipment (P-UE) that performs a communication with an eNB through a first carrier. The P-UE includes a radio frequency (RF) unit configured to transmit or receive a radio signal and a processor operatively connected to the RF unit. The processor is configured to perform: receiving a vehicle-to-everything (V2X) message transmitted by a second UE (V-UE) through a second carrier, and performing synchronization based on the V2X message. The second carrier is different carrier from the first carrier.

In order for a user equipment to perform a V2X communication on a different frequency, not a serving frequency, the user equipment should perform synchronization for the V2X communication in the different frequency. The user equipment may perform synchronization by receiving/detecting a synchronization signal transmitted by V2X user equipment in the different frequency only on a specific time which is predefined or preconfigured. As a result, battery consumption may be reduced. In addition, the time for the user equipment to receive the synchronization signal transmitted by the V2X user equipment in the different frequency may be configured as a gap by a base station, and in the duration configured as the gap, the base station may not perform a transmission of a signal except an essential signal. Since the priority of a communication with the base station is higher than the V2X communication, the V2X communication that collides with the communication with the base station may not be smoothly performed. However, owing to the gap configuration, reliability of the V2X communication may be increased.

DESCRIPTION OF EXEMPLARY EMBODIMENTS

Figure 1:
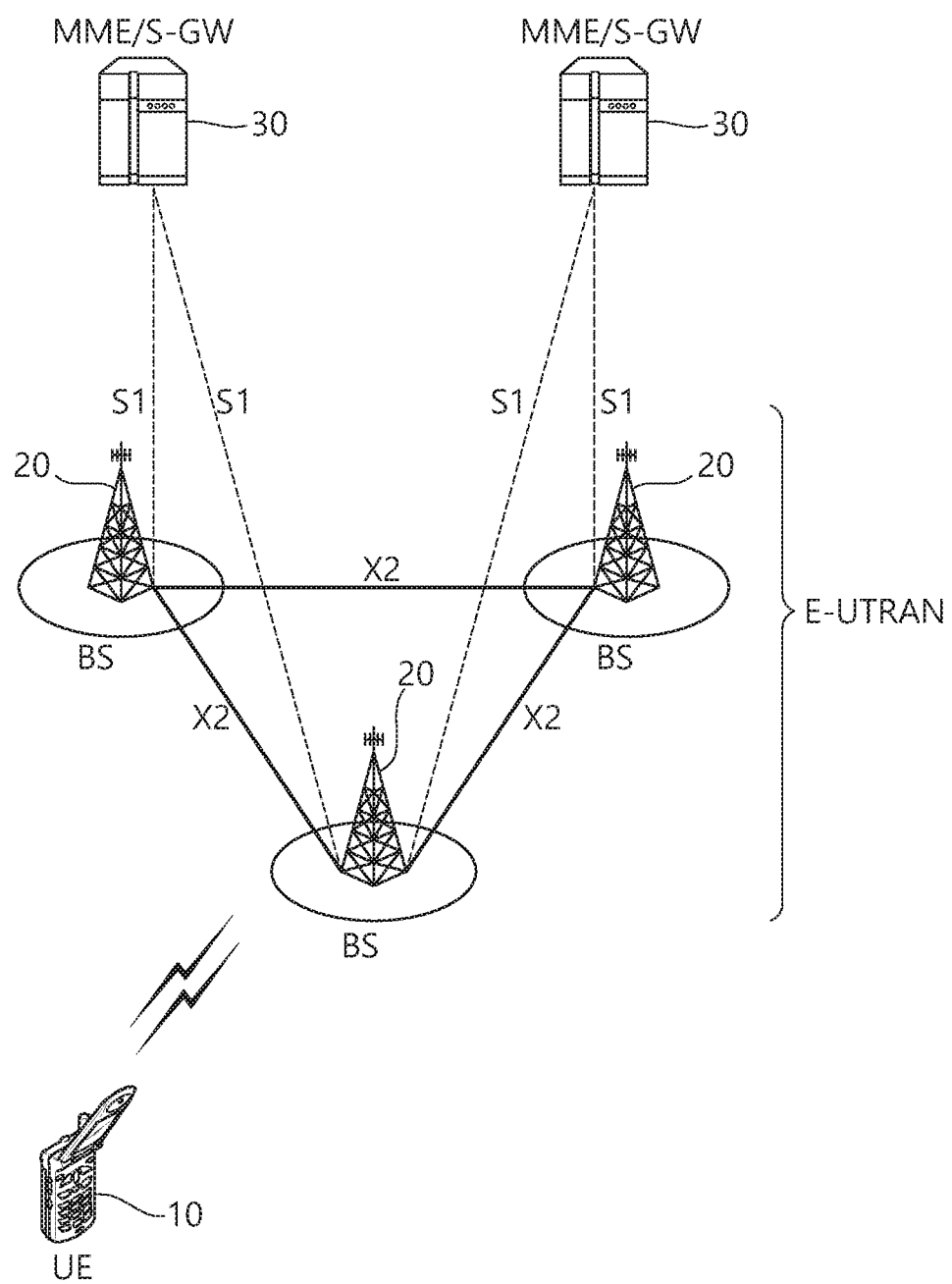
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
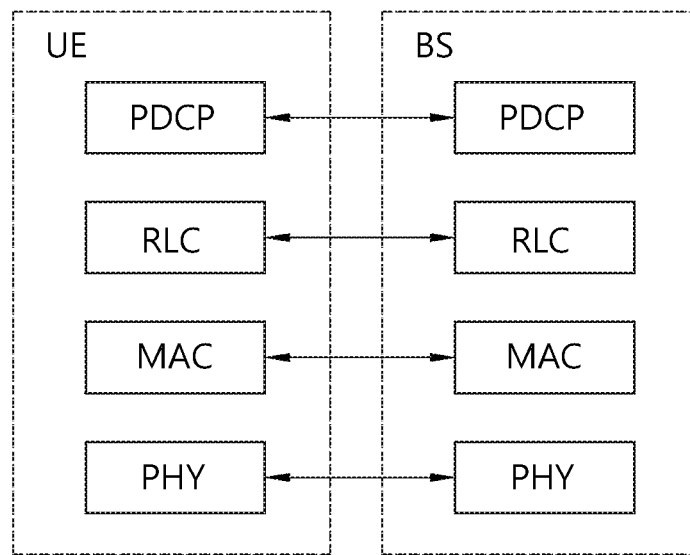
FIG. 2 is a diagram showing a wireless protocol architecture for a user plane.
Figure 3:
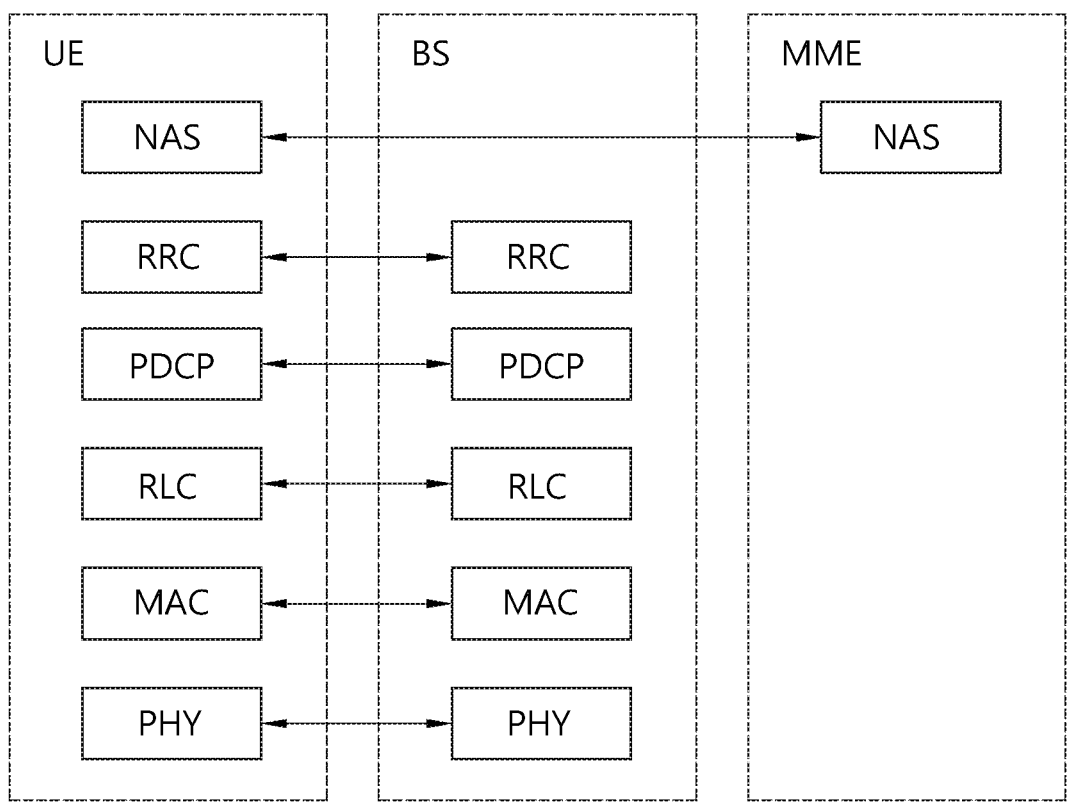
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
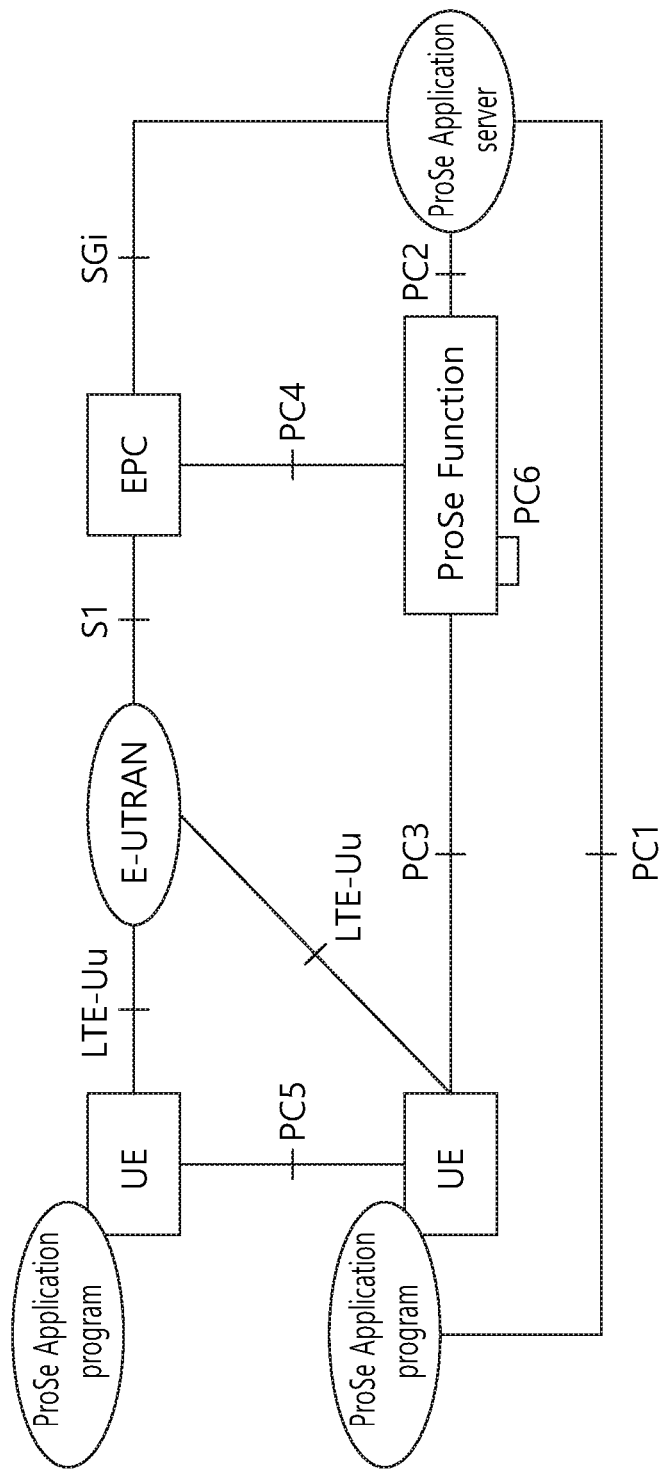
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
  PC5: a reference point used for using control/user plane for discovery and communication, relay, and 1:1 communication between types of UE.
  PC6: a reference point for using a function, such as ProSe discovery, between users belonging to different PLMNs.
  SGi: this may be used to exchange application data and types of application dimension control information.

The D2D operation may be supported both when UE is serviced within the coverage of a network (cell) or when it is out of coverage of the network.

Figure 5:
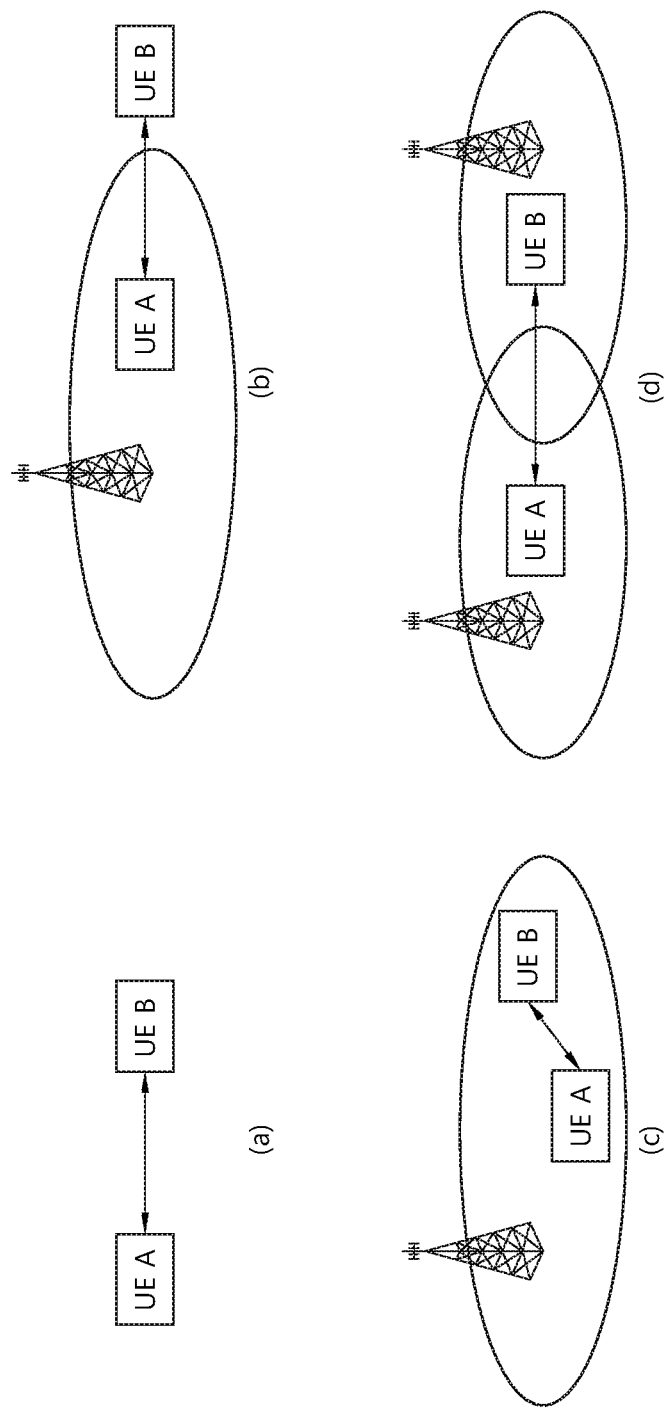
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Hereinafter, the present invention will be described.

The D2D operation described above may also be applied to the VEHICLE-TO-EVERYTHING (V2X). In the V2X, 'X' may be a person or a UE, and in this case, the V2X may be represented as V2P. Alternatively, the 'X' may be a UE installed on a vehicle or an automobile, and in this case, it may be represented as V2V instead of the V2X. Otherwise, the 'X' may also be a road side unit (RSU) of a UE type or a BS type or an infrastructure, and in this case, it may be represented as V2I instead of the V2X. In the present invention, an entity may be interpreted as the same meaning as 'X' described above.

The proposed methods of the present invention provide a method for synchronization among V2X entities efficiently. Hereinafter, in the case that 'X' is a UE possessed by a pedestrian in a V2X communication, such a UE may be referred to as a P-UE or a P-terminal below, and the communication between a vehicle (or a UE installed on a vehicle) and the P-UE may be referred to as V2P. Alternatively, in the case that 'X' is a UE installed on a vehicle, such a UE may be referred to as a V-UE or a V-terminal below, and the communication between UEs installed on vehicles may be referred to as V2V. Otherwise, 'X' may be a road side unit (RSU). The RSU may a UE type or a BS type, and may be a type of infrastructure. In such a case, the communication between a V-UE and the RSU may be referred to as V2I.

Meanwhile, in order to successfully transmit/receive a D2D signal (particularly, V2X signal), time and/or frequency synchronization should be tuned between the UEs that join a D2D communication. In the conventional D2D operation, D2D UEs may be synchronized according to the following order.

When a UE is inside of the coverage of an eNB, the UE synchronizes with the eNB. Since such a UE is indirectly synchronized with other UE which is synchronized with the same eNB, it is available to transmit/receive a D2D signal.

A UE synchronized with a specific eNB may transmit a D2D SYNCHRONIZATION SIGNAL (D2DSS) based on the synchronization with the eNB. The D2DSS is a D2D signal that a UE transmits for the purpose of synchronizing with other UE, and the other UE may be synchronized with the UE by detecting the signal. Particularly, in the case that the UE is a UE existed outside of the coverage of an eNB, for example, the UE is connected with other eNB or a UE which is not connected with any eNB, synchronization is available based on a D2DSS.

A UE located outside of the coverage of an eNB may make other UE be synchronized with the UE itself by transmitting a D2DSS. Types of D2DSSs that are used may be differently defined depending on a coverage state of a D2DSS transmission UE such that a UE detecting a D2DSS distinguishes whether the corresponding D2DSS is transmitted from a UE located inside of the eNB coverage or outside of the eNB coverage. That is, it is available to distinguish and use a D2DSS transmitted from interior of the coverage of an eNB from a D2DSS transmitted from exterior of the coverage of an eNB.

The conventional D2D synchronization scheme described above has the characteristics that a priority is given to the synchronization provided by a network. More particularly, when a UE determines its own transmission synchronization, the UE selects the synchronization signal that an eNB directly transmits as a top priority, and in the case that the UE is located outside of the eNB coverage, the UE is synchronized with the D2DSS transmitted from a UE located inside of the eNB coverage preferentially. The reason why it does this is that a UE is synchronized with a timing provided by a network as much as possible and so as to provide an effect that a D2D operation is smoothly multiplexed with the existing network operation (transmission/reception operation between an eNB and a UE). For example, in the case that a first subframe performs the existing network operation but a second subframe located immediately after the first subframe performs a D2D communication, the D2D communication may interfere the existing network operation unless it is synchronized with the subframe boundary used in the network.

Meanwhile, since a UE (V-UE) installed or mounted on a vehicle may not be seriously sensitive to battery consumption and may use a satellite signal like global positioning system (GPS) for the purpose of navigation, more efficient V2X communication is available when the corresponding GPS signal is used for configuring time and/or frequency synchronization between UEs.

Hereinafter, for the convenience of description, the satellite signal such as GPS, Global Navigation Satellite System (GNSS), GLObal NAvigation Satellite System (GLONAS), GALILEO, BEIDOU and the like will be commonly called as "GPS signal". In addition, the application that discovers a position using the corresponding GPS signal and updates time (and/or frequency) synchronization information will be commonly called as "GPS application". However, the principle of the present invention is not limited to the types of satellite signals.

Figure 6:
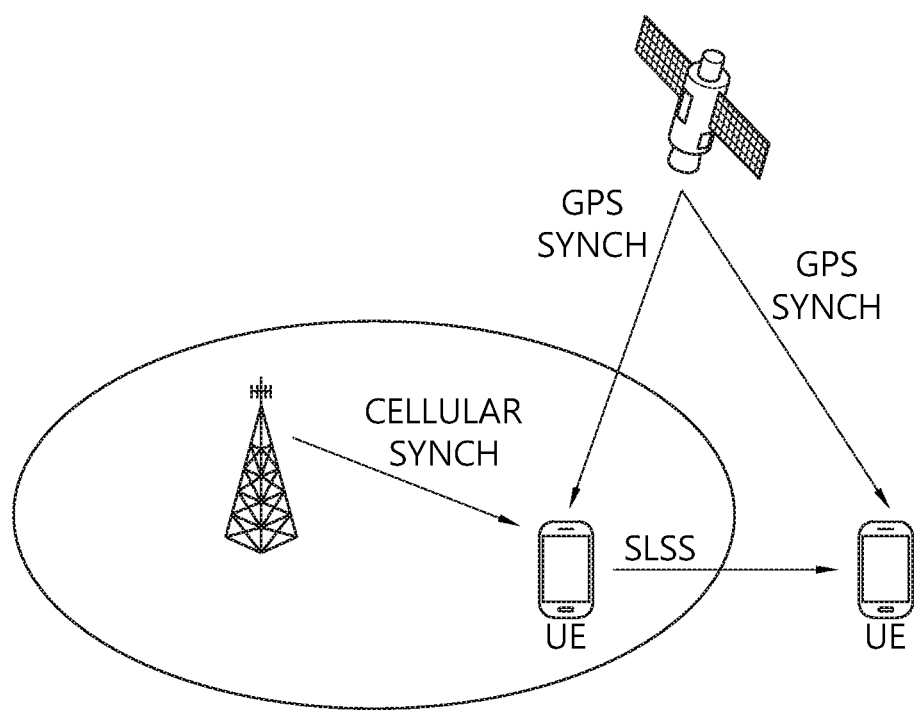
FIG. 6 illustrates a sidelink synchronization signal, GPS synchronization, and cellular synchronization.

FIG. 6 illustrates a sidelink synchronization signal, GPS synchronization, and cellular synchronization.

(1) SIDELINK SYNCHRONIZATION SIGNAL (SLSS): This means a signal that a UE transmits for the purpose of establishing synchronization with other UE.

(2) GPS synchronization: This means time (and/or frequency) synchronization obtained through a GPS signal reception. For example, a UE may configure V2X frame/subframe boundary based on an absolute time (e.g., COORDINATED UNIVERSAL TIME (UTC), GPS time) obtained when receiving a GPS signal, and may setup a part of the whole subframes among these to a subframe of V2X signal transmission (and/or reception) use.

(3) CELLULAR SYNCH: This means time (and/or frequency) synchronization obtained through a reception of a synchronization signal (e.g., PSS/SSS and SLSS) transmitted by a neighboring eNB or an RSU of eNB type. In an aspect of a UE, the corresponding eNB or the RSU of eNB type may be defined as that of an RSRP value of a predefined signal is the highest. On a time of receiving a synchronization signal transmitted by a neighboring eNB or an RSU of eNB type, a UE may setup V2X frame/subframe boundary based on a time when a predefined or signaled predetermined offset (or timing advance) is applied, and may setup a part of the whole subframes among these to a subframe of V2X signal transmission (and/or reception) use. The corresponding offset (or timing advance) value may be setup as '0'.

The methods proposed below provide methods for efficiently tuning (time and/or frequency) synchronization between V-UEs under a V2V communication situation (i.e., a communication situation between a V-UE and a V-UE). However, the proposed methods of the present invention may be extendedly applied to a V2P communication situation (i.e., a communication situation between a V-UE and a P-UE) and/or a V2I communication situation (i.e., a communication situation between a V-UE and an RSU or a communication situation between a V-UE and an infrastructure). In addition, the proposed methods of the present invention may be limitedly applied only to the case that V2X entities perform a V2X communication in an identical (or different) V2X resource pool on an identical V2X carrier which is preconfigured or signaled or the case that V2X entities perform a V2X communication in a V2X resource pool on a different V2X carrier which is preconfigured or signaled.

In addition, the proposed methods of the present invention may be limitedly applied only to the case that V2X entities perform a V2X communication outside of a network coverage (OUT-OF-COVERAGE; OCV) and/or the case that V2X entities perform a V2X communication inside of a network coverage (IN-COVERAGE; ICV) and/or the case that a part of the V2X entities performing a V2X communication are in the ICV and the remaining V2X entities are in the OCV (PARTIAL-COVERAGE; PCV).

[Proposed method #1] It is assumed that a V-UE that maintains GPS synchronization of reliability or a level of quality which is predefined or signaled is "SUSN_VUE". The SUSN_VUE may transmit an SLSS additionally in order to assist a synchronization (/tracking) configuration of other V-UE (it is assumed that such a V-UE is "FASN_VUE") that is unable to maintain GPS synchronization reliability (/quality) of a specific level. The FASN_VUE may be a V-UE that is located in a tunnel and unable to successfully receive a GPS signal, for example.

A rule may be defined such that the (time and/or frequency) synchronization of the SLSS additionally transmitted by the SUSN_VUE is tuned with GPS synchronization or cellular synchronization. Alternatively, a rule may be defined such that the frequency synchronization of the SLSS additionally transmitted by the SUSN_VUE is tuned with cellular synchronization and the time synchronization is tuned with GPS synchronization. Here, a UE that is intended to perform a V2X operation may tune time synchronization and frequency synchronization by using different types of signal, respectively, for example, that is, the time synchronization may be synchronized with GPS synchronization and frequency synchronization may be synchronized with cellular synchronization. For example, in the case that the number of resource blocks in which a GPS signal is transmitted and/or GPS signal transmission frequency are/is limited (and/or in the case that GPS (reception) quality level is lower (than a predefined (/signaled) threshold value), it may be difficult to tune the frequency synchronization with a predetermined accuracy or greater). On the contrary, a signal transmitted by an eNB may be detected by a predetermined number of resource blocks and/or the transmission frequency of the signal may be sufficient and/or (reception) the quality level may be higher (than a predefined (/signaled) threshold value). In such a case, the UE may tune the time synchronization with GPS synchronization and may tune the frequency synchronization with cellular synchronization.

Figure 7:
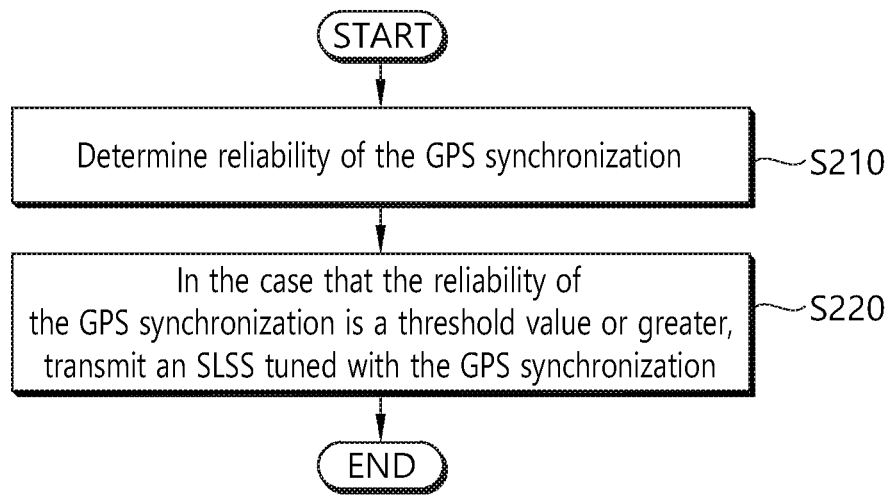
FIG. 7 illustrates a method for transmitting a synchronization signal of a UE according to proposed method #1.

FIG. 7 illustrates a method for transmitting a synchronization signal of a UE according to proposed method #1.

Referring to FIG. 7, a UE determines a reliability of GPS synchronization (step, S210), and in the case that the reliability of the GPS synchronization is a threshold value or greater, the UE transmits an SLSS tuned with the GPS synchronization (step, S220).

When such a proposed method is applied, an FASN_VUE may (re)configure (/perform tracking) efficiently (time and/or frequency) synchronization used for a V2X communication through an SLSS received from an SUSN_VUE. Here, at least one of "ROOT SEQUENCE ID information" used for the corresponding SLSS transmission, "SLSS transmission period/resource/offset information" and "PSBCH RESERVED BIT configuration information (transmitted with (identical) SLSS transmission) may be independently configured in comparison with the cellular synchronization and the GPS synchronization, as an example.

Furthermore, an SLSS transmission of the SUSN_VUE may be performed in at least one of the following cases.

1) A case that the corresponding SLSS transmission is triggered or indicated through the signaling defined by a serving eNB or predefined from an RSU, 2) A case that the RSRP of a specific signal received from a serving eNB (or RSU) is lower (or higher) than a preconfigured threshold value, 3) A case of receiving a request message in relation to such an SLSS transmission from the FASN_VUE, and 4) A case that the SUSN_VUE is located in a specific area which is predefined or signaled.

As another example, in the case of Out CoVerage (OCV), only the SUSN_VUE may perform an SLSS transmission based on the GPS synchronization. A rule may be defined such that an FASN_VUE performs an SLSS transmission based on time and/or frequency synchronization which is independently determined in the case that the SLSS transmitted by the SUSN_VUE is not detected (/received) or in the case that the RSRP of a predefined signal transmitted from the SUSN_VUE is lower than a predefined threshold value.

[Proposed method #2] "GPS synchronization of a level of reliability (/quality) which is predefined or signaled" in [Proposed method #1] may be determined based on a part of or all standards below. That is, the reliability of the GPS synchronization in step S210 in FIG. 7 may be determined by any one method among the following examples below.

Example #2-1

In a GPS signal reception (/connection) state or a GPS application execution state, a UE that maintains time and/or frequency synchronization with a first error value may determine/assume that the time and/or frequency synchronization are/is reliable until the time of exceeding a second error value depending on its own "MAXIMUM CLOCK DRIFT speed". Here, as an example, a relation may be defined as the second error value>the first error value.

Alternatively, in the case that a specific quality in relation to the GPS signal (e.g., RSRP) is a threshold value, which is predefined or signaled, or higher, it may be assumed that the time and/or frequency synchronization are/is reliable.

Alternatively, before a time of successfully receive a GPS signal or a threshold time which is predefined or signaled from the time of successfully updating the GPS synchronization, it may be assumed that the time and/or frequency synchronization are/is reliable.

Example #2-2

Within a predefined or signaled time (it is assumed that this is "TIME_TH"), a UE that performs a GPS signal reception operation of "ON_TH" times which is predefined or signaled at least or an updating operation of time and/or frequency synchronization based on the received GPS signal may assume that the time and/or frequency synchronization are/is reliable.

[Proposed method #3] The 'resource configuration in relation to an SLSS transmission' and 'SLSS transmission subject and allowable condition on the corresponding resource' in [Proposed method #1] may be defined according to a part of or all rules below.

Example #3-1

In the case that one SLSS subframe (SLSS SF) is designated in a period which is preconfigured or signaled, only the UE (i.e., SUSN_VUE) that maintains the GPS synchronization of a level of reliability (/quality) which is predefined or signaled may perform an SLSS transmission operation based on its own GPS synchronization on the corresponding SLSS SF.

In other words, a rule may be defined such that a UE (i.e., FASN_VUE) that fails to maintain the GPS synchronization of a level of reliability (/quality) which is predefined or signaled may perform an operation of receiving an SLSS transmitted by other SUSN_VUE only, not perform an SLSS transmission operation based on its own GPS synchronization on the corresponding SLSS SF. Alternatively, a rule may also be defined so as to perform an SLSS transmission operation with relatively low probability (or power) which is predefined or signaled on the corresponding SLSS SF. That is, an SLSS transmission is not thoroughly prohibited on the corresponding SLSS SF, but an SLSS transmission may be allowed with a low probability.

In the latter case, an operation of receiving an SLSS is performed, which is transmitted by other SUSN_VUE or FASN_VUE on the time of not performing an SLSS transmission operation.

Example #3-2

In the case that a plurality of SLSS subframes (SFs) (e.g., two SFs) is designated in a period which is preconfigured or signaled, it may be configured that the SLSS SF on which the UE (i.e., SUSN_VUE) that maintains the GPS synchronization of a level of reliability (/quality) which is predefined or signaled performs an SLSS transmission operation is different from the SLSS SF on which the UE (i.e., FASN_VUE) that fails to maintain the GPS synchronization of the corresponding level of reliability (/quality) performs an SLSS transmission operation.

Such a rule may be interpreted that the GPS synchronization reliability (/quality) (range) in which an SLSS transmission operation is allowed for each SLSS SF is differently (or independently) configured. Here, as another example, "ROOT SEQUENCE ID information" in relation to an SLSS which is actually transmitted on the SLSS SF on which different GPS synchronization reliability (/quality) (range) is configured, "SLSS transmission period/resource information", "PSBCH RESERVED BIT configuration information (transmitted together with (identical) SLSS transmission)", and the like may be independently (or differently) configured.

[Proposed method #4] The 'the subject that actually performs an SLSS transmission operation based on the SLSS transmission period/resource (/power/probability) which is predefined or signaled' in [Proposed method #1] may be defined according to a part of or all rules below.

Example #4-1

A UE that actually has V2X data to transmit.

Example #4-2

A UE that has an intension of a V2X data transmission (or a UE configured to perform a V2X data transmission from its upper layer or higher layer.

Example #4-3

A UE (i.e., SUSN_VUE) that maintains the GPS synchronization of a level of reliability (/quality) which is predefined or signaled or a UE (i.e., FASN_VUE) that fails to maintain the GPS synchronization of a level of reliability (/quality) which is predefined or signaled.

A rule may be defined such that an FASN_VUE performs an SLSS transmission operation with relatively low probability (or power) which is predefined or signaled. In such a case, an SUSN_VUE may determine whether an SLSS transmission based on its own GPS synchronization is further required by receiving/detecting an SLSS transmitted by the FASN_VUE.

Alternatively, a UE that has a capability in relation to a GPS signal reception or a UE that executes a GPS application.

Meanwhile, a V-UE and a P-UE that perform a V2P communication may be located on different carriers. In this case, it is proposed methods for successfully transmitting/receiving a V2P message (/SLSS) between a V-UE and a P-UE and methods for successfully tuning time and/or frequency synchronization.

Figure 8:
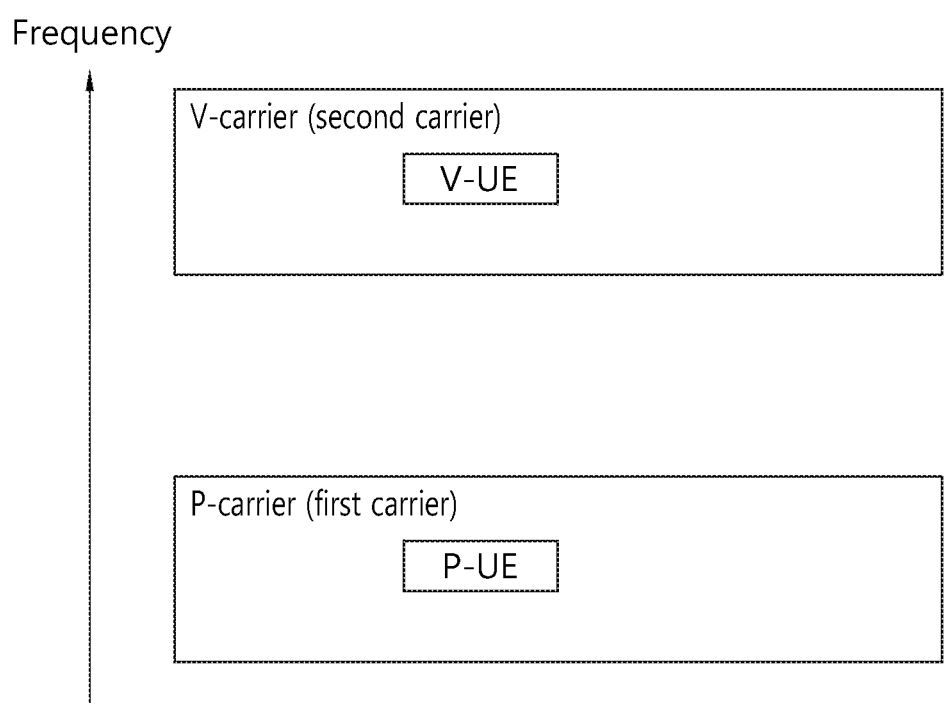
FIG. 8 illustrates a situation in which a V-UE and a P-UE that perform a V2P communication are located on different carriers.

FIG. 8 illustrates a situation in which a V-UE and a P-UE that perform a V2P communication are located on different carriers.

Referring to FIG. 8, the carrier on which a P-UE (e.g., a UE possessed by a pedestrian and a UE installed on a bicycle) performs a communication is referred to "P-carrier" or a first carrier and the carrier on which a V-UE performs a communication is referred to "V-carrier" or a second carrier. The first and second carriers may be carriers of different frequency bands.

FIG. 8 is an example of a V2P, but a part of or all proposed methods below may be extendedly applied to a V2P communication situation (e.g., a communication situation between a V-UE and a P-UE (on different carriers)) and/or a V2I communication situation (e.g., a communication situation between a V-UE and an RSU (on different carriers) or a communication situation between a V-UE and an infrastructure (on different carriers)). In addition, a part of or all proposed methods below may be extendedly applied to the case that V2X entities perform a V2X communication in an identical (or different) V2X resource pool on an identical V2X carrier which is preconfigured or signaled. Furthermore, a rule may be defined such that a part of or all proposed methods below is limitedly applied only to the case of the OCV or the case of the ICV, and the case of the PCV.

[Proposed Method #5]

Figure 9:
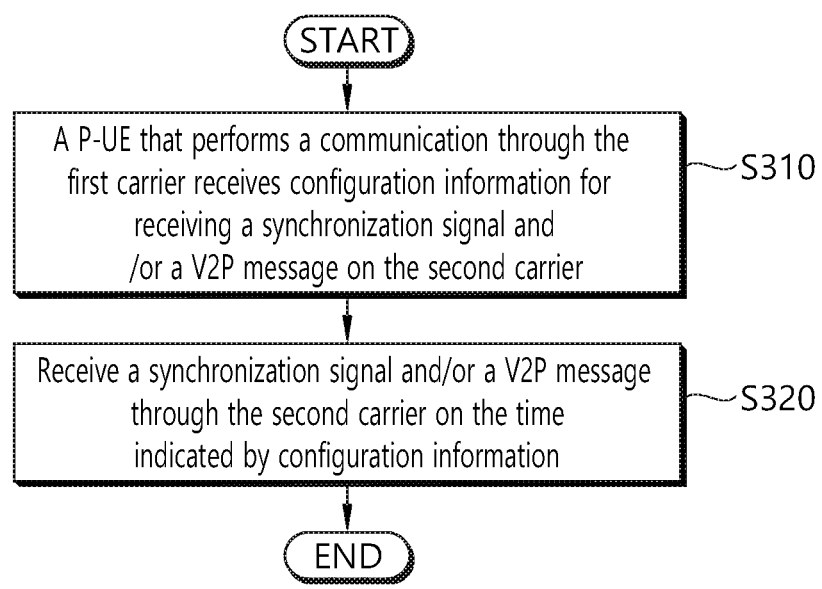
FIG. 9 illustrates a method for performing synchronization of a UE according to proposed method #5 and/or a method for transmitting a V2X message.

FIG. 9 illustrates a method for performing synchronization of a UE according to proposed method #5 and/or a method for transmitting a V2X message.

Referring to FIG. 9, a P-UE that performs a communication through the first carrier (P-carrier) receives configuration information for receiving a synchronization signal (SLSS) and/or a V2P message on the second carrier (V-carrier) (step, S310). Here, as an example, through the synchronization signal, it may be identified whether a use (of a V2X communication (e.g., V2P communication) which is currently performed or a V2X message (e.g., V2P message) which is currently transmitted) is "PS (PUBLIC SAFTY)" or "NON-PS". For example, between "PS" and "NON-PS", an SLSS ID value and/or 'ZADOFF-CHU ROOT SEQUENCE INDEX' value used for generating a PRIMARY SIDELINK SYNCHRONIZATION SIGNAL (PSSS) sequence for each SLSS ID and/or an subframe index (e.g., 'SUBFRAME #0') value which is assumed when a SECONDARY SIDELINK SYNCHRONIZATION SIGNAL (SSSS) sequence is generated may be (partially) differently configured. That is, the SLSS transmitted (or included) together with a V2X message transmitted for PS use may use different sequence from the SLSS transmitted (or included) together with a V2X message transmitted for NON-PS use.

The P-UE receives a synchronization signal and/or a V2P message through the second carrier (V-carrier) on the time indicated by configuration information (step, S320). The UE like the P-UE may be a UE sensitive to battery consumption. The battery consumption of the P-UE may be increased when the P-UE continues to monitor a synchronization signal and/or a V2P message transmitted by a V-UE. Accordingly, the P-UE performs an operation of carrier change/switching from the P-carrier to the V-carrier in order to receive a synchronization signal and/or a V2P message transmitted by a V-UE only on a predetermined time or a configured (/signaled) time. This may be interpreted that in a remaining (time) duration except the corresponding times, the monitoring operation for a synchronization signal and/or a V2P message transmitted by a V-UE is not performed (by changing/switching carriers from the P-carrier to the V-carrier). Here, as an example, such (a part of) rules (in the present invention) may be extendedly applied to the case that a V-UE and a P-UE perform a V2X communication (e.g., V2P communication) on the same carrier (and/or the same resource pool). Hereinafter, each step of FIG. 9 will be described in detail.

A rule may be defined for a P-UE (1) to receive (/detect) a V2P message (/SLSS) transmitted by a V-UE on the V-carrier (the second carrier) according to predefined or signaled period/resource (/time duration) or (2) to receive (/detect) a V2P message (/SLSS) transmitted by a V-UE on the V-carrier (according to predefined or signaled period/resource (/time duration)) only in the case that a reception (/detection) of a V2P message (/SLSS) transmitted by a V-UE on the V-carrier from an eNB (or RSU) is indicated.

Here, in the case of (2), the message indicating a reception (/detection) of a V2P message (/SLSS) transmitted by a V-UE on the V-carrier from an (serving) eNB (or RSU) may be a sort of "warning message" form that informs an occurrence of urgent (/emergency/important) situation.

A rule may be defined for a V-UE to perform a V2P message (/SLSS) transmission for a P-UE that performs a reception/detection operation of a V2P message (e.g., SLSS, the same below) based on a carrier shift (/switching) according to (A) cellular synchronization (of the P-carrier), or (B) GPS synchronization or (C) frequency synchronization based on cellular synchronization (or GPS synchronization) (of the P-carrier) and time synchronization based on GPS synchronization (or cellular synchronization (of the P-carrier)).

As an example, the cellular synchronization information of the P-carrier may be that of a V-UE directly measures or that of signaled from an eNB (or RSU).

A rule may be defined such that a V2P message transmission based on (A) (and/or (C)) synchronization is performed only in the case that a difference between the GPS synchronization and the cellular synchronization (of the P-carrier) is greater than a predefined or signaled threshold value, or a rule may be defined such that a V2P message transmission based on (A) (and/or (C)) synchronization is performed only in the case that a difference between the GPS synchronization and the cellular synchronization (of the P-carrier) is greater than a predefined or signaled threshold value and in the case that an (serving) eNB (or RSU) indicates a V2P message (/SLSS) transmission based on (A) (and/or (C)) synchronization to a V-UE.

Alternatively, a rule may be defined such that a V2P message transmission based on (A) (and/or (C)) synchronization is performed only in the case that an (serving) eNB (or RSU) that receives a reporting of capability information in relation to GPS signal reception from a P-UE indicates a V2P message (/SLSS) transmission based on (A) (and/or (C)) synchronization to a V-UE by considering the P-UE that has no capability in relation to GPS signal reception.

Alternatively, a rule may be defined such that a V2P message (/SLSS) transmission based on (A) (and/or (C))

synchronization is performed only in the case that a predefined request message is received from a P-UE.

Alternatively, a rule may be defined such that a V2P message (/SLSS) transmission based on different synchronization (/period/resource/probability/power) is performed according to a degree of difference (level) between the GPS synchronization and the cellular synchronization (of the P-carrier).

A rule may be defined such that a V-UE performs a V2P message (/SLSS) transmission based on (B) synchronization in the case that the V2P message (/SLSS) transmission condition based on (A) (and/or (C)) synchronization is not satisfied (e.g., a difference between the GPS synchronization and the cellular synchronization (of the P-carrier) is smaller than a predefined or signaled threshold value. As another example, the V2P message (/SLSS) transmission condition according to the cellular synchronization (of the P-carrier) (or frequency synchronization based on the cellular synchronization (or GPS synchronization) (of the P-carrier) and time synchronization based on the GPS synchronization (or cellular synchronization (of the P-carrier)) may increase the probability of successfully receiving (/detecting) a V2P message (/SLSS) (transmitted by a V-UE) in the V-carrier by (1) a P-UE that has no capability in relation to GPS signal reception or (2) a P-UE that fails to maintain the GPS synchronization of a level of reliability (/quality) which is predefined (or signaled) or (3) a P-UE that does not execute a GPS application (by exceeding a predefined (or signaled) time).

As another example, a rule may be defined such that a V-UE transmits an SLSS based on the cellular (time and/or frequency) synchronization (of the P-carrier) for a P-UE (or V-UE) unable to receive a GPS signal, but the V-UE transmits a (predefined) separate channel (periodically) in which difference information between the cellular (time and/or frequency) synchronization (of the P-carrier) and the GPS (time and/or frequency) synchronization.

The resource (/period (/time duration)) in relation to a V2P message (/SLSS) transmitted by a V-UE according to the cellular synchronization of the P-carrier (or frequency synchronization based on the cellular synchronization (or GPS synchronization) of the P-carrier) and time synchronization based on the GPS synchronization (or cellular synchronization of the P-carrier)) may be independently configured from the resource (/period (/time duration)) in relation to a V2X message (/SLSS) transmitted according to the GPS synchronization on the V-carrier.

As an example, a rule may be defined such that a V2P message (/SLSS) transmitted by a V-UE on the V-carrier follows the cellular synchronization (of the P-carrier) (or frequency synchronization based on the cellular synchronization (or GPS synchronization) (of the P-carrier)) and time synchronization based on the GPS synchronization (or cellular synchronization (of the P-carrier)), and a V2V message (/SLSS) (for another V-UE) transmitted by a V-UE on the V-carrier follows the GPS synchronization.

As another example, a rule may be defined such that a P-UE (that attempts to receive (/detect) a V2P message (/SLSS) transmitted by a V-UE on the V-carrier through the carrier switching) performs an SLSS transmission on the V-carrier in the case that a difference between the GPS synchronization and the cellular synchronization (of the P-carrier) is greater than a predefined or signaled threshold, or indicated by an (serving) eNB (or RSU) (in the case that a difference between the GPS synchronization and the cellular synchronization (of the P-carrier) is greater than a predefined or signaled threshold), or in the case the a P-UE fails to maintain the GPS synchronization of a level of reliability (/quality) which is predefined (or signaled), or a P-UE has no capability in relation to GPS signal reception, or in the case that a P-UE does not execute a GPS application (by exceeding a predefined (or signaled) time) according to the cellular synchronization (of the P-carrier) (or frequency synchronization based on the cellular synchronization (or GPS synchronization) (of the P-carrier) and time synchronization based on the GPS synchronization (or cellular synchronization (of the P-carrier)).

Such an SLSS transmission (on the V-carrier) of a P-UE may be performed according to an SLSS transmission period/resource/offset information (and/or ROOT SEQUENCE ID information) which is predefined or signaled. Here, as an example, a V-UE performs a V2P message (/SLSS) transmission according to (time and/or frequency) the synchronization derived from the corresponding detected (/received) (P-UE) SLSS.

As another example, for a P-UE (that attempts to receive (/detect) a V2P message (/SLSS) transmitted by a V-UE on the V-carrier through the carrier switching), in the case that the corresponding P-UE has the capability in relation to a GPS signal reception, a rule may be defined such that the P-UE updates the GPS synchronization (available to be interpreted by the synchronization of the V-UE) by executing (or turning on) a GPS application based on a predefined (or signaled) period.

Based on the synchronization obtained through it, the P-UE may assume a resource position (/synchronization) in relation to an SLSS (/V2P message) transmission of the V-UE, and accordingly, a search time may be decreased or a reception (/detection) success probability may be increased when an SLSS (/V2P message) of the V-UE is received later.

[Proposed Method #6]

Figure 10:
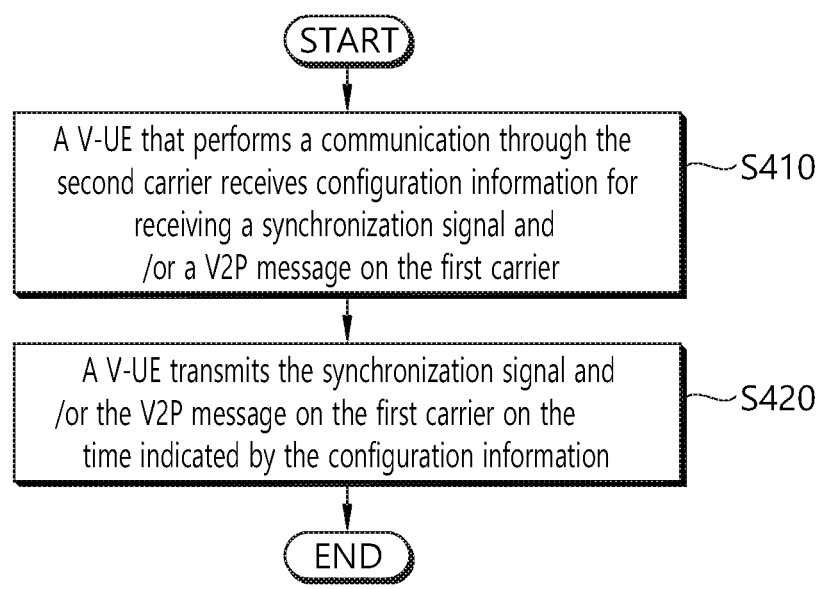
FIG. 10 illustrates a method for transmitting a synchronization signal of a UE and/or a method for transmitting a V2X message according to proposed method #6.

FIG. 10 illustrates a method for transmitting a synchronization signal of a UE and/or a method for transmitting a V2X message according to proposed method #6.

Referring to FIG. 10, a V-UE that performs a communication on the second carrier receives configuration information for transmitting a synchronization signal (SLSS) and/or a V2P message on the first carrier (step, S410).

The V-UE transmits the synchronization signal and/or the V2P message on the first carrier on the time indicated by the configuration information (step, S420).

Hereinafter, each step of FIG. 10 will be described in detail.

1) A rule may be defined such that the V-UE transmits a V2P message (/SLSS) on the P-carrier according to a predefined or signaled period/resource (/time duration). In addition, a rule may be defined such that the P-UE transmits a V2P message (/SLSS) on the P-carrier in accordance with the time when the P-UE wakes up for a periodic reception (/detection) of a predefined "warning message". 2) Alternatively, a rule may be defined such that the V-UE transmits a V2P message (/SLSS) on the P-carrier according to a predefined or signaled period/resource (/time duration) only in the case that a V2P message (/SLSS) transmission from a serving eNB (or RSU) is indicated. 3) Alternatively, a rule may be defined such that the V-UE transmits a V2P message (/SLSS) on the P-carrier according to a predefined or signaled period/resource (/time duration) only in the case that a predefined or signaled urgent (/emergency/important) situation (/event) occurs.

When the V-UE performs a V2P message (/SLSS) transmission on the P-carrier through the carrier shift (/switching), a rule may be defined, for the P-UE on the P-carrier, such that (A) the cellular synchronization (of the P-carrier), (B) the GPS synchronization or (C) frequency synchronization based on the cellular synchronization (or GPS synchronization) (of the P-carrier)) and time synchronization based on the GPS synchronization (or cellular synchronization (of the P-carrier)).

The cellular synchronization information (of the P-carrier) may be that of a V-UE directly measures or that of signaled from an (serving) eNB (or RSU).

A rule may be defined such that a V2P message (/SLSS) transmission based on (A) (and/or (C)) synchronization is performed only in the case that a difference between the GPS synchronization and the cellular synchronization (of the P-carrier) is greater than a predefined (or signaled) threshold value. Alternatively, a rule may be defined such that a V2P message transmission based on (A) (and/or (C)) synchronization is performed only in the case that a difference between the GPS synchronization and the cellular synchronization (of the P-carrier) is greater than a predefined (or signaled) threshold value and in the case that an (serving) eNB (or RSU) indicates a V2P message (/SLSS) transmission based on the (A) (and/or the (C)) synchronization to a V-UE. Alternatively, a rule may be defined such that a V2P message transmission based on (A) (and/or (C)) synchronization is performed only in the case that an (serving) eNB (or RSU) that receives a reporting of capability information in relation to GPS signal reception from a P-UE indicates a V2P message (/SLSS) transmission based on (A) (and/or (C)) synchronization to a V-UE (by considering the P-UE that has no capability in relation to GPS signal reception). Alternatively, a rule may be defined such that a V2P message (/SLSS) transmission based on the (A) (and/or the (C)) synchronization is performed only in the case that a predefined request message is received from a P-UE. Alternatively, a rule may be defined such that a V2P message (/SLSS) transmission based on different synchronization (/period/resource/probability/power) is performed according to a degree of difference (level) between the GPS synchronization and the cellular synchronization (of the P-carrier).

A rule may be defined such that a V-UE performs a V2P message (/SLSS) transmission based on (B) synchronization in the case that the V2P message (/SLSS) transmission condition based on the (A) (and/or the (C)) synchronization is not satisfied (e.g., a difference between the GPS synchronization and the cellular synchronization (of the P-carrier) is smaller than a predefined or signaled threshold value.

Alternatively, the V2P message (/SLSS) transmission condition according to the cellular synchronization (of the P-carrier) (or frequency synchronization based on the cellular synchronization (or GPS synchronization) (of the P-carrier) and time synchronization based on the GPS synchronization (or cellular synchronization (of the P-carrier)) may increase the probability of successfully receiving (/detecting) a V2P message (/SLSS) (transmitted by a V-UE) in the P-carrier by (1) a P-UE that has no capability in relation to GPS signal reception, (2) a P-UE that fails to maintain the GPS synchronization of a level of reliability (/quality) which is predefined (or signaled) or (3) a P-UE that does not execute a GPS application (by exceeding a predefined (or signaled) time).

Alternatively, a rule may be defined such that a V-UE transmits an SLSS based on the cellular (time and/or frequency) synchronization (of the P-carrier) for a P-UE (or V-UE) unable to receive a GPS signal, but the V-UE transmits a (predefined) separate channel (periodically) in which difference information between the cellular (time and/or frequency) synchronization (of the P-carrier) and the GPS (time and/or frequency) synchronization.

The resource (/period (/time duration)) in relation to a V2P message (/SLSS) transmitted by a V-UE according to the cellular synchronization (of the P-carrier) (or frequency synchronization based on the cellular synchronization (or GPS synchronization) (of the P-carrier)) and time synchronization based on the GPS synchronization (or cellular synchronization (of the P-carrier)) may be independently configured from the resource (/period (/time duration)) in relation to a V2X message (/SLSS) transmitted according to the GPS synchronization on the P-carrier.

A rule may be defined such that a V2P message (/SLSS) transmitted by a V-UE on the P-carrier follows the cellular synchronization (of the P-carrier) (or frequency synchronization based on the cellular synchronization (or GPS synchronization) (of the P-carrier)) and time synchronization based on the GPS synchronization (or cellular synchronization (of the P-carrier)), and a V2V message (/SLSS) (for another V-UE) transmitted by a V-UE on the p-carrier follows the GPS synchronization.

According to a part of or all of the rules, when the V-UE transmits a V2P message (/SLSS) on the P-carrier through the carrier switching, a rule may be defined such that a P-UE performs an SLSS transmission on the V-carrier in the case that a difference between the GPS synchronization and the cellular synchronization (of the P-carrier) is greater than a predefined (or signaled) threshold, or indicated by an (serving) eNB (or RSU) (in the case that a difference between the GPS synchronization and the cellular synchronization (of the P-carrier) is greater than a predefined or signaled threshold), or in the case the a P-UE fails to maintain the GPS synchronization of a level of reliability (/quality) which is predefined or signaled, or a P-UE has no capability in relation to GPS signal reception, or in the case that a P-UE does not execute a GPS application (by exceeding a predefined or signaled time) according to the cellular synchronization (of the P-carrier) (or frequency synchronization based on the cellular synchronization (or GPS synchronization) of the P-carrier and time synchronization based on the GPS synchronization (or cellular synchronization of the P-carrier).

Such an SLSS transmission (on the P-carrier) of a P-UE may be performed according to an SLSS transmission period/resource/offset information (and/or ROOT SEQUENCE ID information) which is predefined or signaled. A V-UE performs a V2P message (/SLSS) transmission according to (time and/or frequency) the synchronization derived from the corresponding detected (/received) (P-UE) SLSS.

As another example, for a P-UE (that attempts to receive (/detect) a V2P message (/SLSS) transmitted by a V-UE on the P-carrier), in the case that the corresponding P-UE has the capability in relation to a GPS signal reception, the P-UE may update the GPS synchronization (available to be interpreted by the synchronization of the V-UE) by executing (or turning on) a GPS application based on a predefined or signaled period. Through this, battery consumption may be decreased while the synchronization is maintained such that an immediate reception (/detection) of a V2P message (/SLSS) transmitted by the V-UE is available. Based on the synchronization obtained through it, the P-UE may assume a resource position (/synchronization) in relation to an SLSS (/V2P message) transmission of the V-UE, and accordingly, a search time may be decreased or a reception (/detection) success probability may be increased when an SLSS (/V2P message) of the V-UE is received later. In the case that there is no (serving) eNB (or RSU) in a carrier (this is referred to as "V2X-OCVCARRIER") on which a V2X communication is performed, that is, in the case that it is available to be interpreted as the coverage OCV, the proposed methods below propose methods for transmitting/receiving a V2X message (/SLSS) efficiently and methods for tuning (time and/or frequency) synchronization efficiently by a V2X entity in the corresponding V2X-OCVCARRIER.

In a part of or all of the proposed methods, it is assumed the situation in which a P-UE transmits/receives a V2X message (/SLSS) in the corresponding V2X-OCVCARRIER. However, this is not a limitation. That is, the proposed methods below may be extendedly applied to the situation in which a V-UE transmits/receives a V2X message (/SLSS) in the corresponding V2X-OCVCARRIER. In addition, the proposed methods below may be extendedly applied to the case that a V2X-OCVCARRIER is the ICV and/or the PCV.

[Proposed Method #7]

In the case that a P-UE has no capability in relation to GPS signal reception, a P-UE fails to maintain the GPS synchronization of a level of reliability (/quality) which is predefined or signaled, or a P-UE does not execute a GPS application by exceeding a predefined or signaled time, and the like, and in the case that it is regarded (/assumed) that the P-UE is in the ICV state (i.e., a state located in the eNB coverage) in other carrier with high probability, an (serving) eNB (or RSU) of the P-UE may inform the 'ASSIST INFORMATION' in relation to a V2X message (/SLSS) transmission/reception on a V2X-OCVCARRIER through signaling which is predefined.

Figure 11:
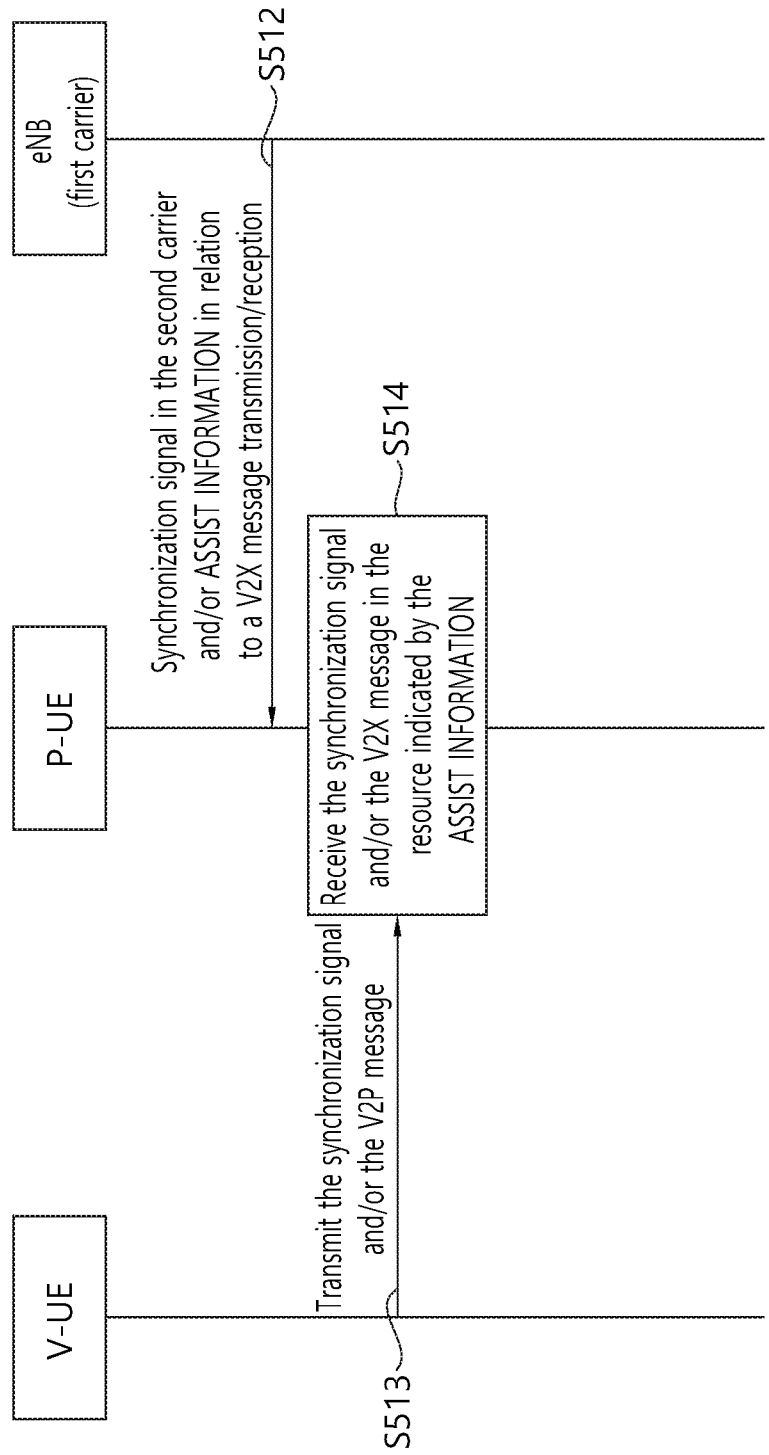
FIG. 11 illustrates proposed method #7.

FIG. 11 illustrates proposed method #7.

Referring to FIG. 11, an eNB that communicates in the first carrier transmits a synchronization signal (SLSS) in the second carrier and/or ASSIST INFORMATION in relation to a V2X message transmission/reception to a P-UE (step, S512). A V-UE transmits a synchronization signal and/or a V2X message (step, S513), and the P-UE receives the synchronization signal and/or the V2X message (transmitted from the V-UE) in the resource indicated by the ASSIST INFORMATION (step, S514).

Each step of FIG. 11 will be described in detail.

The ASSIST INFORMATION may include at least one of the following types of information.

(A) Whether a P-UE transmits/receives a V2X message (/SLSS) on a V2X-OCVCARRIER according to the cellular (time and/or frequency) synchronization of an ICV carrier, or (B) in the case that (OCV UE) SYNCH REFERENCE is detected (/selected) on a V2X-OCVCARRIER, whether a P-UE transmits/receives a V2X message (/SLSS) on an OCVCARRIER according to the (time and/or frequency) synchronization derived from the SLSS transmitted by the corresponding SYNCH REFERENCE, or (C) (in the case that (OCV UE) SYNCH REFERENCE is not detected (/selected) (or is detected (/selected)) on a V2X-OCVCARRIER) whether a P-UE transmits/receives a V2X message (/SLSS) on an OCVCARRIER according to the time (and/or frequency) synchronization independently determined from cellular frequency and/or time synchronization of an ICV carrier (or time (and/or frequency) synchronization derived from the SLSS transmitted by the corresponding SYNCH REFERENCE), and the like.

The SYNCH REFERENCE may be designated as a (OCV) UE of which RSRP of a predefined signal is greater (greatest) than a predefined threshold value. An (serving) eNB (or RSU) (of an ICV carrier) may inform on which rule among (A), (B) and (C) described above is applied through a predefined signaling to the P-UE.

Example #7-1

The ASSIST INFORMATION may include resource (configuration) information in relation to a V2X message (/SLSS) transmission/reception on a V2X-OCVCARRIER. Here, as an example, the corresponding resource (configuration) information may include a period, an offset, frame number information (this is referred to as "VFN") of a resource in relation to a V2X message (/SLSS) transmission/reception, and the like. The corresponding resource (configuration) information may be signaled based on 'SFN 0' of an (serving) eNB (or RSU).

Example #7-2

The ASSIST INFORMATION may include synchronization information in relation to a V2X message (/SLSS) transmission/reception on a V2X-OCVCARRIER. The synchronization information may include at least one of a SEARCH WINDOW value (this is referred to as "W") in relation to a V2X message (/SLSS) detection (/reception), difference information between the synchronization of a carrier in which an (serving) eNB (or RSU) is existed (in relation to V2X communication or WAN communication) and the synchronization of a V2X-OCVCARRIER (in relation to V2X communication), and difference information between a starting point of 'SFN 0' configured based on the synchronization of a carrier in which an (serving) eNB (or RSU) is existed (in relation to V2X communication or WAN communication) and a starting point of 'SFN 0' configured based on the synchronization of a V2X-OCVCARRIER (in relation to V2X communication). In addition, the UE that receives the corresponding SEARCH WINDOW value (W) may perform a detection (/reception of the corresponding V2X message (/SLSS) within '±W' based on the offset (refer to (Example #7-1) in relation to a V2X message (/SLSS) resource.

[Proposed method #8] A rule may be defined such that a P-UE omits a part of (or the whole) physical sidelink broadcast channel (PSBCH) transmission on a V2X-OCVCARRIER in [Proposed method #7]. It may be interpreted that only an SLSS is transmitted on the time when a PSBCH transmission is omitted. In addition, such a rule may be similar to (LTE-A, REL-12) ICV discovery transmission/reception operation (only an SLSS transmission is performed without a PSBCH transmission) which is performed based on an assistance of a network (or an eNB) under the ICV environment. The PSBCH resource which is not used on the time when a PSBCH transmission is omitted may be used for an additional SLSS transmission according to a predefined rule. Furthermore, the number of SLSS transmissions on a subframe on which a PSBCH transmission is omitted may be increased in comparison with the number of SLSS transmissions on a subframe on which a PSBCH transmission is performed. Through such a method, a successful detection (/reception) probability of an SLSS may be increased within a short time.

The proposed methods below propose method for a V2X transmission/reception entity that has a LIMITED TX/RX CAPABILITY (i.e., a V2X entity available to perform transmission/reception operation (simultaneously) only on a limited number of carriers on a specific time) to transmit/receive a V2X message (/SLSS) efficiently on a carrier (this is referred to as "V2X-carrier") on which a V2X communication is performed.

Hereinafter, it is assumed that a P-UE is a UE that has a limited reception (transmission) capability, for example, a UE that has a SHARED RX (/TX) CHAIN. In addition, in an aspect of the P-UE, it is assumed a situation in which a carrier on which WAN communication is performed (this is referred to as "WAN-carrier") and a V2X-carrier are different. The P-UE has no capability of simultaneously receiving (/transmitting) the WAN-carrier and the V2X-carrier.

The proposed methods below may be extendedly applied to the situation that the WAN-carrier and the V2X-carrier are different, in an aspect of a V-UE. In addition, a rule may be defined such that the proposed methods below are limitedly applied only to the case that the V2X-carrier (and/or the WAN-carrier) is the OCV and/or the ICV and/or the PCV. Furthermore, a rule may be defined such that the proposed methods below are limitedly applied only to the FDD system (the TDD system) environment.

[Proposed Method #9]

A rule may be defined such that a P-UE that has a limited reception (/transmission) capability (or shares a reception (/transmission) chain between other communication (e.g., WAN DL (/UL) and a V2X communication) assumes (/regards) that a gap is setup dynamically on the WAN-carrier or predefined or signaled gap configuration in relation to the WAN-carrier becomes valid or performs a V2X message (/SLSS) reception (/transmission) operation (and/or carrier switching ('WAN-carrier to V2X-carrier') operation) on the V2X-carrier during the corresponding gap duration, only in the case that a pre-designated message (or indicator) (this is referred to as "GAPON_MSG") is received from a serving eNB (or RSU) or other V-UE.

Figure 12:
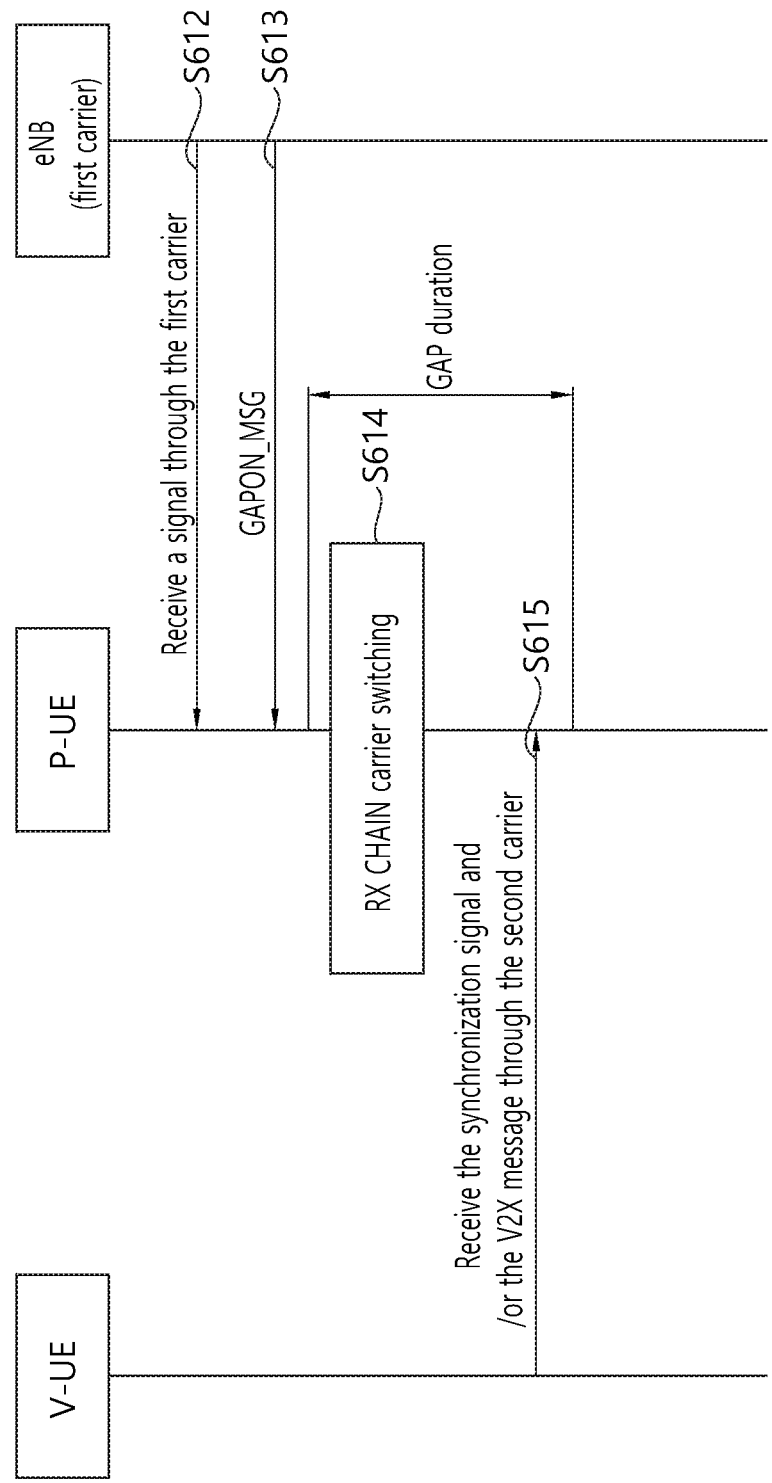
FIG. 12 illustrates proposed method #9.

FIG. 12 illustrates proposed method #9.

Referring to FIG. 12, an eNB transmits a signal to a P-UE through the first carrier, and the P-UE receives a signal through the first carrier (step, S612). That is, the eNB and the P-UE perform a normal cellular communication (WAN communication) through the first carrier. The eNB transmits 'GAPON_MSG' to the P-UE (step, S613). The P-UE performs a carrier switching (to the second carrier) in an RX CHAIN of a receiving unit in the (preconfigured or signaled) gap duration (step, S614), and receives a synchronization signal (SLSS) and/or a V2X message (during the corresponding gap duration) through the second carrier (step, S615). Now, each step of FIG. 12 will be described in detail.

During the gap duration, the P-UE may not perform the WAN communication reception (/transmission) operation (and/or V2X communication reception (/transmission) operation) (in relation to the remaining WAN signal (/channel) except the reception (/transmission) operation in relation to predefined a part of WAN signal (/channel) (e.g., SIB, paging and RAR)) on the WAN-carrier.

The GAPON_MSG may be a sort of "warning message" form that an (serving) eNB (or RSU) or other V-UE on the WAN-carrier informs an occurrence of urgent (/emergency/ important) situation.

The resource/period/offset information and the like in relation to the GAPON_MSG (or the warning message) reception (/detection) may be signaled (or defined) in advance from an (serving) eNB (or RSU) or other V-UE on the WAN-carrier.

[Proposed method #10] In the [Proposed method #9], the GAPON_MSG may be a message (or an indicator) which is predefined or signaled UE-group-specific form (or cell-specific form or UE-specific form).

In the case that the GAPON_MSG is a message (or an indicator) of the UE-group-specific form (or cell-specific form), only the UE that has a limited reception/transmission capability (or has shared reception/transmission chain) may assume (/regard) that a gap is dynamically setup on the WAN-carrier or may assume (/regard) that predefined or signaled a gap configuration in relation to the WAN-carrier becomes valid, among the UEs that receive the corresponding GAPON_MSG.

That is, the UE of which reception/transmission capability is not limited (i.e., the UE that has enough reception/ transmission capability (/reception/transmission chain) does not assume (/regard) that a gap is dynamically setup on the WAN-carrier or does not assume (/regard) that predefined or signaled a gap configuration in relation to the WAN-carrier becomes valid, even in the case that the UE receives the corresponding GAPON_MSG.

Here, although a gap is not dynamically setup on the WAN-carrier for such a UE (or although a gap in relation to the WAN-carrier which is predefined or signaled is not applied (/assumed), a rule may be defined such that the UE performs a V2X message (/SLSS) reception (/transmission) on the V2X-carrier.

Alternatively, (1) it may be informed that a gap is dynamically setup on the WAN-carrier or it may be informed that a gap configuration in relation to the WAN-carrier (which is predefined or signaled) is valid, (2) the GAPON_MSG indicating a V2X message (/SLSS) reception (/transmission) on the V2X-carrier may be interpreted as "dynamic GAP configuration indicator signaled through a predefined channel (e.g., PDCCH) (with carrier indication information (available to be interpreted as carrier information on which a gap is setup)).

In the proposed methods, a rule may be defined such that an SLSS transmission of a V2X entity (or V-UE/P-UE) is limitedly performed only in the case that the RSRP value of a specific signal received from an (serving) RSU (or eNB) is greater (or smaller) than a predefined or signaled threshold value.

In the proposed methods, it may also be assumed that a (ICV) P-UE performs a V2X communication (or WAN communication) according to the cellular synchronization (of the P-carrier) and a V-UE performs a V2X communication according to the GPS synchronization.

In addition, in the proposed methods, in the case that a serving eNB (or RSU) located on a separate carrier has a capability in relation to a GPS signal reception (or in the case that a serving eNB (or RSU) located on a separate carrier maintains the GPS synchronization in a level of predefined or signaled reliability (/quality)), a (V/P-) UE (or a V-UE that looses a GPS signal or the GPS synchronization) is not required to separately execute (or turn on) a GPS application, and may use the synchronization of the serving eNB (or RSU) (located on a separate carrier) (or the cellular synchronization) in a V2X communication of the (other) V-UE without any change.

A serving eNB (or RSU) located on a separate carrier may inform its own capability information in relation to a GPS signal reception (or information in relation to whether to maintain the GPS synchronization in a level of predefined or signaled reliability (/quality)) to a UE through a predefined signaling.

In the case that such an operation (/rule) is applied, in a situation in which a serving eNB (or RSU) located on a separate carrier is tuned with the GPS synchronization, a (V/P-) UE that is synchronized (in time and/or frequency) with the serving eNB (or RSU) located on a separate carrier may regard (/interpret) it as the GPS synchronization virtually.

Examples of the above-described proposed methods can be included as one of methods implemented by the present invention and thus can be considered as proposed methods. Furthermore, while the aforementioned proposed methods may be independently implemented, some proposed methods may be combined (merged). As an example, while the proposed method has been described based on 3GPP LTE/

LTE-A in the present invention for the convenience of description, the range of the system to which the proposed method is applied may be extended to various systems in addition to 3GPP LTE/LTE-A. For example, the proposed methods of the present invention may be extended to a D2D communication. Here, the D2D communication means that a UE directly communicates with other UE using a wireless channel. In this case, a UE means a UE of a user, but a network device like an eNB may also be regarded as a sort of UE in the case that the network equipment transmits/receives a signal according to the communication scheme between UEs.

A rule may be defined such that the above-described proposed methods may be restrictively applied to an FDD system (and/or a TDD system) environments.

The above-described proposed methods may be used independently or in combination.

Figure 13:
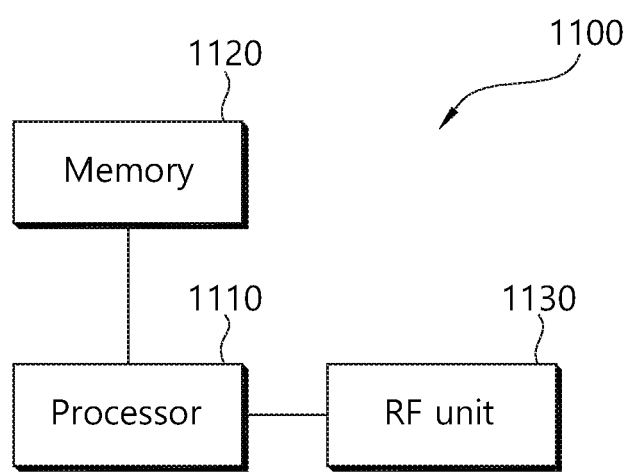
FIG. 13 is a block diagram illustrating a UE in which the embodiments of the present invention are implemented.

FIG. 13 is a block diagram illustrating a UE in which the embodiments of the present invention are implemented.

Referring to FIG. 13, a UE 1100 includes a processor 1110, a memory 1120 and a radio frequency (RF) unit 1130. The processor 1110 implements the proposed functions, processes and/or methods.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for performing synchronization a wireless communication system, the method performed by a first user equipment (UE) and comprising:
receiving a first vehicle-to-everything (V2X) synchronization message transmitted by a second UE,
wherein the second UE is a vehicle UE, and
wherein the first V2X synchronization message includes a Sidelink synchronization signal (SLSS) and a first Physical Sidelink Broadcast Channel (PSBCH) signal; and
performing the synchronization based on the first V2X synchronization message,
wherein, based on the first UE being a vehicle UE, the first UE performs a first V2X communication with a third UE, the first V2X communication including transmitting a second V2X synchronization message,
wherein, based on the first UE being a pedestrian UE, the first UE performs a second V2X communication with the third UE, the second V2X communication not including transmitting the second V2X synchronization message,
wherein the second V2X synchronization message comprises a second PSBCH signal,
wherein the first UE, the second UE and the third UE support the V2X communication,
wherein the vehicle UE is a UE on a vehicle and the pedestrian UE is a UE which is possessed by a pedestrian, and
wherein at least one of the first PSBCH signal or the second PSBCH signal is information related to the synchronization.

2. The method of claim 1, wherein the first UE performs the first V2X communication or the second V2X communication with the second UE after performing the synchronization based on the V2X message.

3. The method of claim 1, wherein the first UE receives configuration information for receiving the first V2X synchronization message from the eNB.

4. The method of claim 1, wherein the third UE is a pedestrian UE or a vehicle UE.

5. The method of claim 1,
wherein the first V2X communication with the third UE includes a sidelink synchronization signal (SLSS), and
wherein the second V2X communication with the third UE does not include the SLSS.

6. A first user equipment (UE) comprising:
a transceiver configured to transmit or receive a radio signal; and
a processor operatively coupled to the transceiver,
wherein the processor is configured to:
control the transceiver to receive a first vehicle-to-everything (V2X) synchronization message transmitted by a second UE,
wherein the second UE is a vehicle UE, and
wherein the first V2X synchronization message includes a Sidelink synchronization signal (SLSS) and a first Physical Sidelink Broadcast Channel (PSBCH) signal; and
perform synchronization based on the first V2X synchronization message,
wherein, based on the first UE being a vehicle UE, the first UE performs a first V2X communication with a third UE, the first V2X communication including transmitting a second V2X synchronization message,
wherein, based on the first UE being a pedestrian UE, the first UE performs a second V2X communication with the third UE, the second V2X communication not including transmitting the second V2X synchronization message,
wherein the second V2X synchronization message comprises a second PSBCH signal,
wherein the first UE, the second UE and the third UE support the V2X communication,
wherein the vehicle UE is a UE on a vehicle and the pedestrian UE is a UE which is possessed by a pedestrian, and
wherein at least one of the first PSBCH signal or the second PSBCH signal is information related to the synchronization.

7. The first UE of claim 6, wherein the third UE is a pedestrian UE or a vehicle UE.

8. The first UE of claim 6,
wherein the first V2X communication with the third UE includes a sidelink synchronization signal (SLSS), and
wherein the second V2X communication with the third UE does not include the SLSS.

* * * * *